United States Patent
Schumann, Jr. et al.

(10) Patent No.: US 9,786,009 B2
(45) Date of Patent: Oct. 10, 2017

(54) SYSTEM AND METHOD FOR ADMINISTERING A TELEMATICS-ENABLED TEST DRIVE DEALER PROGRAM

(75) Inventors: Douglas D. Schumann, Jr., Wethersfield, CT (US); Alex M. Carges, West Hartford, CT (US); Michael Patrick Slattery, Puyallup, WA (US); Ben J. Lim, South Windsor, CT (US)

(73) Assignee: HARTFORD FIRE INSURANCE COMPANY, Hartford, CT (US)

( * ) Notice: Subject to any disclaimer, the term of this patent is extended or adjusted under 35 U.S.C. 154(b) by 930 days.

(21) Appl. No.: 13/306,388

(22) Filed: Nov. 29, 2011

(65) Prior Publication Data

US 2013/0138460 A1   May 30, 2013

(51) Int. Cl.
*G06Q 40/08* (2012.01)
*G06Q 30/06* (2012.01)
*G06Q 50/30* (2012.01)

(52) U.S. Cl.
CPC ............ *G06Q 40/08* (2013.01); *G06Q 30/06* (2013.01); *G06Q 50/30* (2013.01)

(58) Field of Classification Search
CPC .................................................. G06Q 40/08
See application file for complete search history.

(56) References Cited

U.S. PATENT DOCUMENTS

| | | | |
|---|---|---|---|
| 5,797,134 A | 8/1998 | McMillan et al. | |
| 6,064,970 A | 5/2000 | McMillan et al. | |
| 6,868,386 B1 | 3/2005 | Henderson et al. | |
| 7,240,017 B2 * | 7/2007 | Labelle et al. | 705/4 |
| 7,659,827 B2 * | 2/2010 | Gunderson | G08G 1/16 340/576 |
| 7,945,497 B2 * | 5/2011 | Kenefick | G06Q 40/00 705/35 |
| 8,090,598 B2 * | 1/2012 | Bauer et al. | 705/4 |
| 8,131,588 B2 | 3/2012 | Walker et al. | |
| 8,140,358 B1 | 3/2012 | Ling et al. | |
| 8,254,011 B2 * | 8/2012 | Baur | B32B 17/10174 359/265 |

(Continued)

*Primary Examiner* — Bruce I Ebersman
(74) *Attorney, Agent, or Firm* — Howard IP Law Group, PC (57) ABSTRACT

Systems and methods are disclosed herein for pricing an insurance premium based on telematics data. The system includes a communications interface and a business logic processor in communications with the communications interface. The communications interface receives telematics data collected by a telematics acquisition device configured at a dealership for collecting telematics data of a vehicle sold by the dealership. The communications interface also receives vehicle data indicating the make and model of the vehicle sold and vehicle owner data related to the purchaser of the vehicle sold. The business logic processor determines an insurance quote for the purchaser based on the received telematics data, vehicle data, and vehicle owner data. The communications interface transmits the insurance quote for the purchaser of the vehicle. The business logic processor also manages a predetermined incentive that is provided to the purchaser in return for allowing the telematics data acquisition device to collect telematics data.

16 Claims, 7 Drawing Sheets

(56) References Cited

U.S. PATENT DOCUMENTS

| | | | |
|---|---|---|---|
| 2002/0111725 A1* | 8/2002 | Burge | 701/29 |
| 2009/0109037 A1* | 4/2009 | Farmer | 340/576 |
| 2010/0241465 A1 | 9/2010 | Amigo et al. | |
| 2011/0196571 A1* | 8/2011 | Foladare et al. | 701/33 |
| 2011/0264472 A1 | 10/2011 | Mostelac | |
| 2012/0004933 A1* | 1/2012 | Foladare et al. | 705/4 |
| 2012/0072241 A1 | 3/2012 | Krause et al. | |
| 2012/0072244 A1* | 3/2012 | Collins et al. | 705/4 |

* cited by examiner

SYSTEM AND METHOD FOR ADMINISTERING A TELEMATICS-ENABLED TEST DRIVE DEALER PROGRAM

FIELD OF THE INVENTION

In general, the invention relates to a computerized system and method for determining the price of an insurance premium based on the telematics data.

BACKGROUND OF THE INVENTION

The insurance industry has begun exploring the use of telematics sensors and other location-aware devices in motor vehicles for the purposes of underwriting, pricing, renewing, and servicing vehicle insurance. Currently, insurers first enroll a customer in an insurance plan with a discount for agreeing to telematics monitoring, and then insurers begin collecting data. Insurers do not gather telematics data before offering insurance, so insurers are not able to determine the safety of customers' driving behavior before offering them a discount. In some implementations, insurers offer a further discount to customers if the collected telematics data shows that they have safe driving behaviors. However, insurers typically do not add surcharges for customer if the telematics data shows that they have unsafe driving behaviors. Thus, by setting the base rates before collecting telematics data, insurance rates often do not correspond to actual driving behaviors exhibited by the customers being insured and monitored.

SUMMARY

Therefore, there is a need in the art to collect data related to the driving behavior of drivers before offering them vehicle insurance. By collecting data before setting a premium price, insurance companies can base their offered premium rates on actual driving behavior. One way to reach drivers to install monitoring devices in their vehicles to determine their driving behavior is to offer insurance when drivers purchase a vehicle. At the time of purchase, a vehicle dealer discusses the insurance plan with the vehicle purchaser and offers to install a monitoring device at the dealership. The possibility of discounted insurance would incentivize the driver to be monitored, and the vehicle purchaser can be given additional incentives, such as free or discounted vehicle services, to agree to have the device installed. After the monitoring device has collected enough data to determine the safety of the driving behavior of the driver, the insurance company calculates an insurance rate for the driver based on the telematics data and offers a long-term rate to the driver.

Accordingly, systems and methods are disclosed herein for pricing an insurance premium based on telematics data. The system includes a communications interface and a business logic processor in communications with the communications interface. The communications interface receives telematics data collected by a telematics acquisition device configured at a dealership for collecting telematics data of a vehicle sold by the dealership. The communications interface also receives vehicle data indicating the make and model of the vehicle sold and vehicle owner data related to the purchaser of the vehicle sold. The business logic processor determines an insurance quote for the purchaser based on the received telematics data, vehicle data, and vehicle owner data. The communications interface transmits the insurance quote for the purchaser of the vehicle. The business logic processor also manages a predetermined incentive that is provided to the purchaser in return for allowing the telematics data acquisition device to collect telematics data.

In some embodiments, the predetermined incentive is an offer to pay for a deductible cost for a claim filed with a second insurer. Alternatively, the predetermined incentive can be an offer to pay for a service performed on the vehicle by the dealership. In still other embodiments, the predetermined incentive is an offer to provide at least one of a service performed on the vehicle and a replacement vehicle if the vehicle malfunctions. In such embodiments, the communications interface can receive data related to the vehicle malfunction, and the business logic processor processes a claim made by the purchaser related to the malfunction.

[0006] In some embodiments, the communications interface receives data related to the vehicle purchaser from an application for a loan to fund the purchase of the vehicle. The business logic processor then further bases the insurance quote on the data collected in the loan application process. In other embodiments, the telematics data acquisition device is a first telematics data acquisition device, and the communications interface receives data collected by a second telematics data acquisition device. The business logic processor then further bases the insurance quote on the telematics data collected by the second telematics data acquisition device. The data collected by the second telematics data may have been collected during a period of time before data is collected by the first telematics data acquisition device.

In some embodiments, the business logic processor transmits an insurance premium price and insurance premium payment schedule to the dealership, which can convey this information to the purchaser. The dealership can also receive a payment for the insurance from the purchaser, and the communications interface receives the payment for the insurance from the dealership.

In some embodiments, the business logic processor determines a quote for short-term insurance based on the vehicle data and the vehicle owner data. After the business logic processor receives a predetermined amount of telematics data, the business logic processor can then determine a longer-term insurance quote.

According to other aspects, the invention relates to computerized methods for carrying out the functionalities described above.

According to other aspects, the invention relates to a system for selling insurance for a vehicle that is similar to the above described system. However, in these other aspects, the communications interface does not receive the telematics data, but rather receives an indication of whether telematics data is being collected by a telematics data acquisition device. In such aspects, the business logic processor determines the insurance quote based on at least the indication of whether telematics data is being collected, the received vehicle data, and the received vehicle owner data.

In some embodiments, the communications interface receives the telematics data collected by the telematics data acquisition device, and the business logic processor determines the insurance quote further based on the received telematics data.

In some embodiments, the business logic processor applies a discount to the insurance quote based on an indication that telematics data is being collected by the telematics data acquisition device. The business logic processor can alternatively determine a discount to apply to the insurance quote based on an indication received by the communications interface of the frequency or duration of telematics data acquisition.

In other embodiments, the business logic processor conditions the providing of the predetermined incentive to the purchaser on whether telematics data is being collected by the telematics data acquisition device. The business logic processor can alternatively condition the providing of the predetermined incentive based on an indication received by the communications interface of the frequency or duration of telematics data acquisition.

DESCRIPTION OF CERTAIN ILLUSTRATIVE EMBODIMENTS

To provide an overall understanding of the invention, certain illustrative embodiments will now be described, including systems and methods for pricing an insurance premium based on telematics data. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof.

Figure 1:
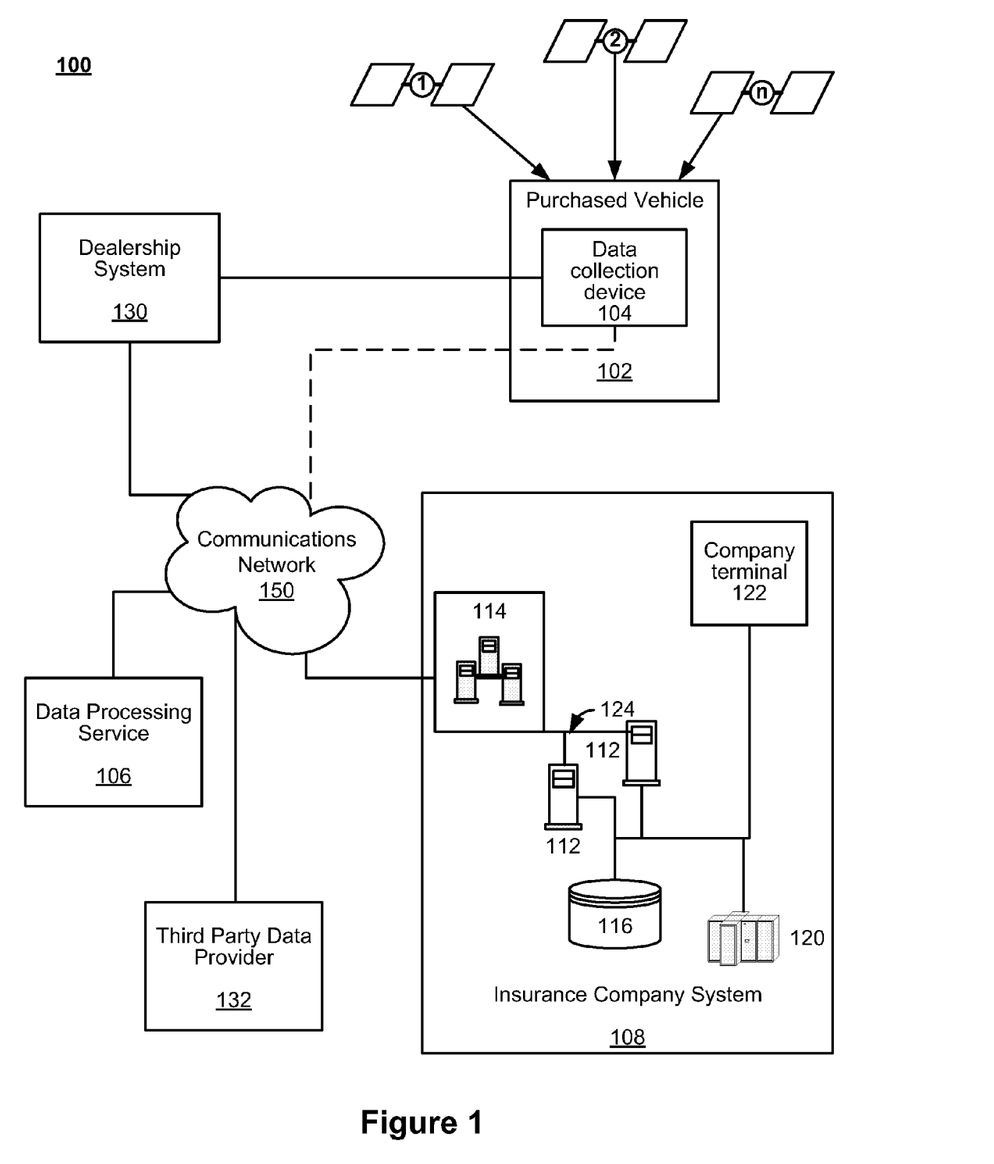
FIG. 1 is an architectural model of a system for selling vehicle insurance, according to an illustrative embodiment of the invention.

FIG. 1 is a block diagram of a system 100 for pricing an insurance premium based on telematics data, according to an illustrative embodiment. The system 100 uses data telematics collected over a period of time to determine the behavior and safety of a vehicle and its driver. An insurance company uses data related to speed, vehicle handling, driving times, distance traveled, location of the vehicle, and condition of the automobile to assess the behavior and safety of the driver. With a sufficient amount of data, the insurance company can calculate an insurance premium for the driver based on the driving behaviors and the condition of the vehicle. In some implementations, the telematics data is processed or assessed by a third party data processing service. In addition, the insurance premium price may be set by an underwriter, which may be a part of the insurance company or otherwise affiliated with or in a third party arrangement with the insurance company.

The system 100 includes one or more vehicles 102, each having a data collection device 104. The vehicle 102 may be an automobile, motorcycle, truck, bus, watercraft, aircraft, or any other vehicle operated by a driver. A data collection device 104 is coupled to a vehicle 102 for collecting data about the vehicle's location, movements, or other information that can be used to determine driving behavior and safety. The data collection device 104 may be positioned inside the vehicle, attached to the outside of the vehicle, or integrated into the vehicle. For vehicles with multiple drivers, the data may be associated with the vehicle itself or with the individual drivers. A dealer associated with dealership system 130 installs the data collection device 104 or a program running on the data collection device 104. In return, the dealer can receive royalties or lead generation fees from the insurance company, or the dealer may be an authorized agent of the insurance company.

In some embodiments, data from the data collection device 104 is directly transmitted to the dealership system 130 without traveling through the communications network 150. In such embodiments, the data collection device 104 is connected to the dealership system 130 using a wired or wireless connection when the data collection device 104 is returned to a dealership. The dealership system 130 then sends the collected data to the insurance company system 108 or a third party data processing service. In other embodiments, the data collection device 104 is in communication with an insurance company system 108 and/or a dealership system 130 over a communications network 150. The data collection device 104 may communicate with the insurance company system 108 though a wireless network such as a cellular network or using a wireless Internet connection.

The data collection device 104 can be any computing device or plurality of computing devices in cooperation having a data collection sensor (e.g., an antenna or an accelerometer), a processor, a memory, and a means for transmitting the collected data. The customer vehicle 102 or data collection device 104 may include an antenna for receiving signals from global navigation satellite system (GNSS) satellites, numbered 1 through n in FIG. 1. In some embodiments, the data collection device 104 is also configured to process the collected data, e.g., by summarizing and/or compressing the data. In some embodiments, the data processing protects the driver's privacy by encrypting the data, removing location information, producing summary information, or taking other measures to reduce the likelihood that location information or other sensitive information are received by the insurance company or third parties. The components of the data collection device 104 are discussed further in relation to FIG. 3, and an alternative data collection device is described in relation to FIG. 4.

In some embodiments, rather than sending collected data directly to the insurance company system 108, the data collection device 104 or the dealership system 130 sends collected data to a data processing service 106, which processes the data to determine vehicle safety and driving behavior information that is then sent to the insurance company system 108 for setting an insurance premium price. This can help protect a driver's privacy, since the insurance company does not receive detailed data about a driver's location, but only receives summary information, e.g., a driving behavior rating or score. Using a data processing service 106 is in some implementations also preferable to having the data collection device 104 process data because it reduces the processing power needed by data collection device 104 and because using a third party data processing service 106 may also make it more difficult for drivers to tamper with the data. The data processing service can perform additional monitoring functions, such as vehicle security monitoring or providing location-based alerts (e.g., alerting a parent or employer when a vehicle goes outside of a specified range) and/or speed alerts.

The insurance company system 108 includes a plurality of application servers 112, a plurality of load balancing proxy servers 114, an insurance company database 116, a processing unit 120, and company terminal 122. These computing devices are connected by a local area network 124.

The application servers 112 are responsible for interacting with the data collection device 104 and/or the data processing service 106. The data exchange between the insurance company system 108 and dealership system 130, data collection device 104, and/or data processing service 106 can utilize push and pull technologies where the application servers 112 of the insurance company system 108 can act as both a server and client for pushing data to the dealership system 130, data collection device 104, and/or data processing service 106 (e.g., which vehicles to monitor, when to stop data collection, rules for monitoring services requested by the customer) and for pulling data from the dealership system 130, data collection device 104, and/or data processing service 106. The application servers 112 or other servers of the insurance company system 108 can request to receive periodic data feeds from the dealership system 130, the data collection device 104, or data processing service 106. The communication between the application servers 112 and the dealership system 130, data collection device 104, and/or data processing service 106 can follow various known communication protocols, such as TCP/IP. Alternatively, the application servers 112 and dealership system 130, data collection device 104, and/or data processing service 106 can communicate with each other wirelessly, e.g., via cellular communication, Wi-Fi, Wi-Max, or other wireless communications technologies or combination of wired or wireless channels. The load balancing proxy servers 114 operate to distribute the load among application servers 112.

The insurance company database 116 stores information about vehicular insurance policies. For each insurance policy, the database 116 includes for example and without limitation, the following data fields: policy coverage, policy limits, deductibles, the agent responsible for the sale or renewal, the date of purchase, dates of subsequent renewals, product and price of product sold, applicable automation services (for example, electronic billing, automatic electronic funds transfers, centralized customer service plan selections, etc.), customer information, customer driving behavior, customer payment history, or derivations thereof.

The processing unit 120 is configured for determining the price of an insurance premium based on driving behavior and other information related to the driver and the vehicle. The processing unit 120 may comprise multiple separate processors, such as a driving behavior processor, which analyzes driving behavior from raw or processed data received from the dealership system 130, data collection device 104, and/or data processing service 106 over the communications network 150; and a business logic processor, which determines a premium price for a policyholder based on, among other things, the driving behavior. In some embodiments, insurance premium prices or information for making insurance pricing determinations may be generated by a third-party underwriter, which is separate from the insurance company system 108. An exemplary implementation of a computing device for use in the processing unit 120 is discussed in greater detail in relation to FIG. 2.

The company terminals 122 provide various user interfaces to insurance company employees to interact with the processing system 120. The interfaces include, without limitation, interfaces to review driving behavior data; to review vehicle data; to review customer or potential customer data; to retrieve data related to insurance policies; to manually adjust driving behavior ratings; and to manually adjust premium pricing. In some instances, different users may be given different access privileges. For example, marketing employees may only be able to retrieve information on insurance policies but not make any changes to data. Such interfaces may be integrated into one or more websites for managing the insurance company system 108 presented by the application servers 112, or they may be integrated into thin or thick software clients or stand alone software. The company terminals 122 can be any computing devices suitable for carrying out the processes described above, including personal computers, laptop computers, tablet computers, smartphones, servers, and other computing devices.

User terminals can provides various user interfaces to dealerships or customers to interact with the insurance company system 108 over the communications network 150. For example, the dealership system 130 can include dealership terminals that dealers interacting with potential customers can use to retrieve policy and pricing information for insurance policies offered by the insurance company. Customers may also use their personal computers, smartphones, tablet computers, or other computing devices as terminals for accessing user interfaces provided by the insurance company. For example, customers can access a web page or application provided by the insurance company to enter information pertaining to changes in their insurance policy, e.g., changes in policy coverage, addition or subtraction of drivers, addition or subtraction of vehicles, relocation, mileage information, etc.

In some embodiments, the data collection device 104 is not continually connected to the insurance company system 108 via the network 150. For example, the data collection device 104 may be configured to temporarily store data if the data collection device 104 becomes disconnected from the network, like when it travels out of range of cellular towers. When the connection is restored, the data collection device 104 can then transmit the temporarily stored data to the insurance company system 108. The data collection device 104 may alternatively be configured to connect to the communications network 150 through a user's home Wi-Fi network. In this case, the data collection device 104 stores trip data until it returns to the vicinity of the user's home, connects to the user's wireless network, and sends the data. As mentioned above, in many embodiments, the data collection device 104 is not connected to the network 150 at all, but rather, data collected is retrieved at the dealership and then transmitted to the insurance company. For example, the dealership couples the data collection device 104 to a purchased vehicle, and when the vehicle owner returns the vehicle to the dealership (e.g. for service), the dealership retrieves the data collection device 104 and mail the device 104 with the collected data to the insurance company system 108 or extracts and sends the collected data to the insurance company system 108 or the data processing service 106 via the communications network 150.

In some embodiments, data from a third party data provider 132 is accessed by one or more of the data collection device 104, the data processing service 106, the insurance company system 108, and or/the dealership system 130 over the communications network 150. Data from a third party data provider 132 can be used in calculating an insurance premium. For example, the third party data provider 132 can provide traffic or weather data that is processed in conjunction with the received telematics data to evaluate driving patterns in view of the road conditions. Other third party data providers 132 provide data related to a customer or a potential customer, such as the customer's driving record or credit history.

Figure 2:
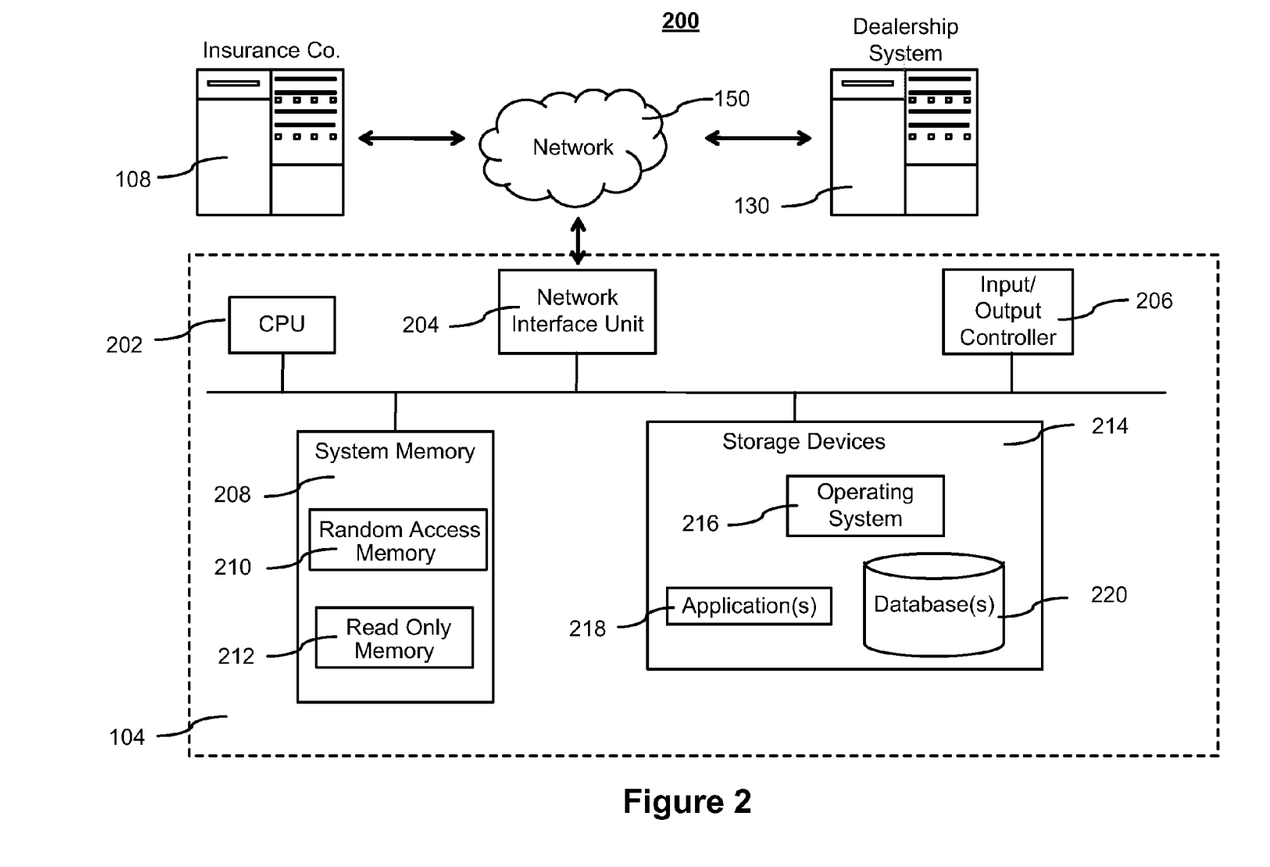
FIG. 2 is a block diagram of a computing system as used in FIG. 1, according to an illustrative embodiment of the invention.

FIG. 2 is a block diagram of a computing device 200 used for carrying out at least one of driving behavior processing and business logic processing described in relation to FIG. 1, according to an illustrative embodiment of the invention. The computing device comprises at least one network interface unit 204, an input/output controller 206, system memory 208, and one or more data storage devices 214. The system memory 208 includes at least one random access memory (RAM) 210 and at least one read-only memory (ROM) 212. All of these elements are in communication with a central processing unit (CPU) 202 to facilitate the operation of the computing device 200. The computing device 200 may be configured in many different ways. For example, the computing device 200 may be a conventional standalone computer or alternatively, the functions of computing device 200 may be distributed across multiple computer systems and architectures. The computing device 200 may be configured to perform some or all of the driving behavior and business logic processing, or these functions may be distributed across multiple computer systems and architectures. In the embodiment shown in FIG. 1, the computing device 200 is linked, via network 150 or local network 124 (also described in FIG. 1), to other servers or systems housed by the insurance company system 108, such as the load balancing server 114, and the application servers 112, and to the dealership system 130.

The computing device 200 may be configured in a distributed architecture, wherein databases and processors are housed in separate units or locations. The computing device 200 may also be implemented as a server located either on site near the insurance company system 108, or it may be accessed remotely by the insurance company system 108. Some such units perform primary processing functions and contain at a minimum a general controller or a processor 202 and a system memory 208. In such an embodiment, each of these units is attached via the network interface unit 204 to a communications hub or port (not shown) that serves as a primary communication link with other servers, client or user computers and other related devices. The communications hub or port may have minimal processing capability itself, serving primarily as a communications router. A variety of communications protocols may be part of the system, including, but not limited to: Ethernet, SAP, SAS™, ATP, BLUETOOTH™, GSM and TCP/IP.

The CPU 202 comprises a processor, such as one or more conventional microprocessors and one or more supplementary co-processors such as math co-processors for offloading workload from the CPU 202. The CPU 202 is in communication with the network interface unit 204 and the input/output controller 206, through which the CPU 202 communicates with other devices such as other servers, user terminals, or devices. The network interface unit 204 and/or the input/output controller 206 may include multiple communication channels for simultaneous communication with, for example, other processors, servers or client terminals. Devices in communication with each other need not be continually transmitting to each other. On the contrary, such devices need only transmit to each other as necessary, may actually refrain from exchanging data most of the time, and may require several steps to be performed to establish a communication link between the devices.

The CPU 202 is also in communication with the data storage device 214. The data storage device 214 may comprise an appropriate combination of magnetic, optical and/or semiconductor memory, and may include, for example, RAM, ROM, flash drive, an optical disc such as a compact disc and/or a hard disk or drive. The CPU 202 and the data storage device 214 each may be, for example, located entirely within a single computer or other computing device; or connected to each other by a communication medium, such as a USB port, serial port cable, a coaxial cable, an Ethernet type cable, a telephone line, a radio frequency transceiver or other similar wireless or wired medium or combination of the foregoing. For example, the CPU 202 may be connected to the data storage device 214 via the network interface unit 204.

The CPU 202 may be configured to perform one or more particular processing functions. For example, the computing device 200 may be configured for calculating ratings related to driving behavior. The same computing device 200 or another similar computing device may be configured for calculating an insurance premium for a vehicle based at least the driving behavior.

The data storage device 214 may store, for example, (i) an operating system 216 for the computing device 200; (ii) one or more applications 218 (e.g., computer program code and/or a computer program product) adapted to direct the CPU 202 in accordance with the present invention, and particularly in accordance with the processes described in detail with regard to the CPU 202; and/or (iii) database(s) 220 adapted to store information that may be utilized to store information required by the program. The database(s) 220 may including all or a subset of data stored in insurance company database 116, described above with respect to FIG. 1, as well as additional data, such as formulas or manual adjustments, used in establishing the insurance risk for a vehicle.

The operating system 216 and/or applications 218 may be stored, for example, in a compressed, an uncompiled and/or an encrypted format, and may include computer program code. The instructions of the program may be read into a main memory of the processor from a computer-readable medium other than the data storage device 214, such as from the ROM 212 or from the RAM 210. While execution of sequences of instructions in the program causes the CPU 202 to perform the process steps described herein, hard-wired circuitry may be used in place of, or in combination with, software instructions for implementation of the processes of the present invention. Thus, embodiments of the present invention are not limited to any specific combination of hardware and software.

Figure 5:
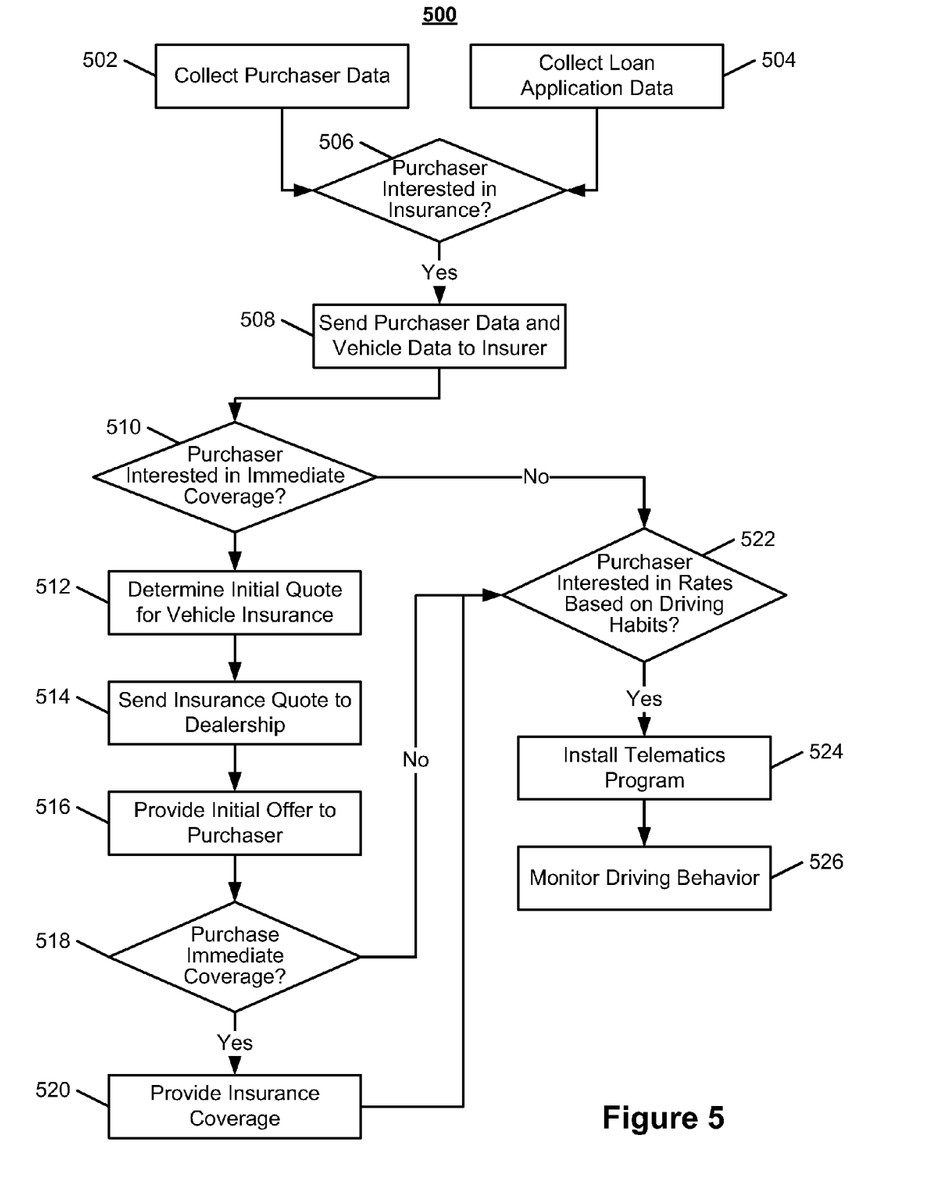
FIG. 5 is a flowchart of a method for selling vehicle insurance at a dealership, according to an illustrative embodiment of the invention.
Figure 6:
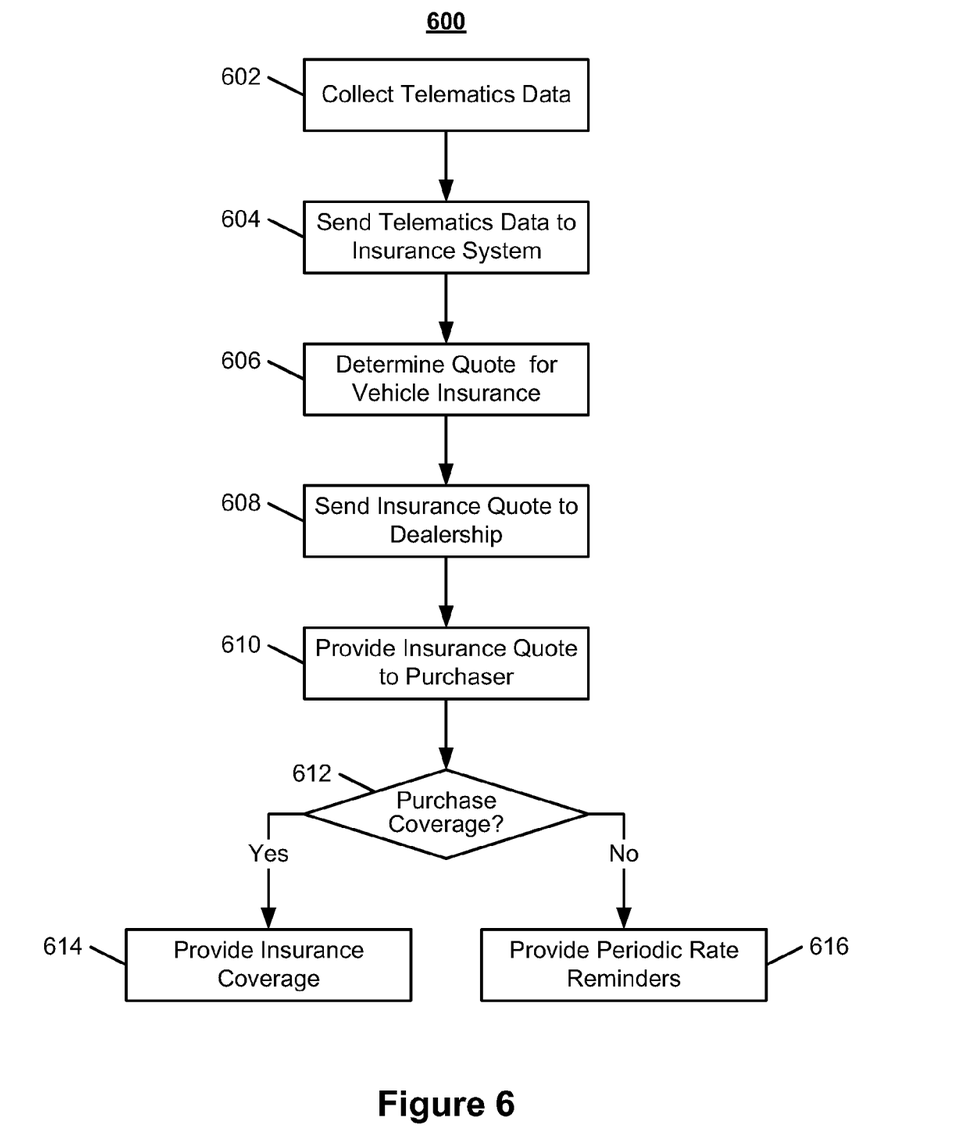
FIG. 6 is a flowchart of a method for determining an insurance rate for a driver based on telematics data, according to an illustrative embodiment of the invention.
Figure 7:
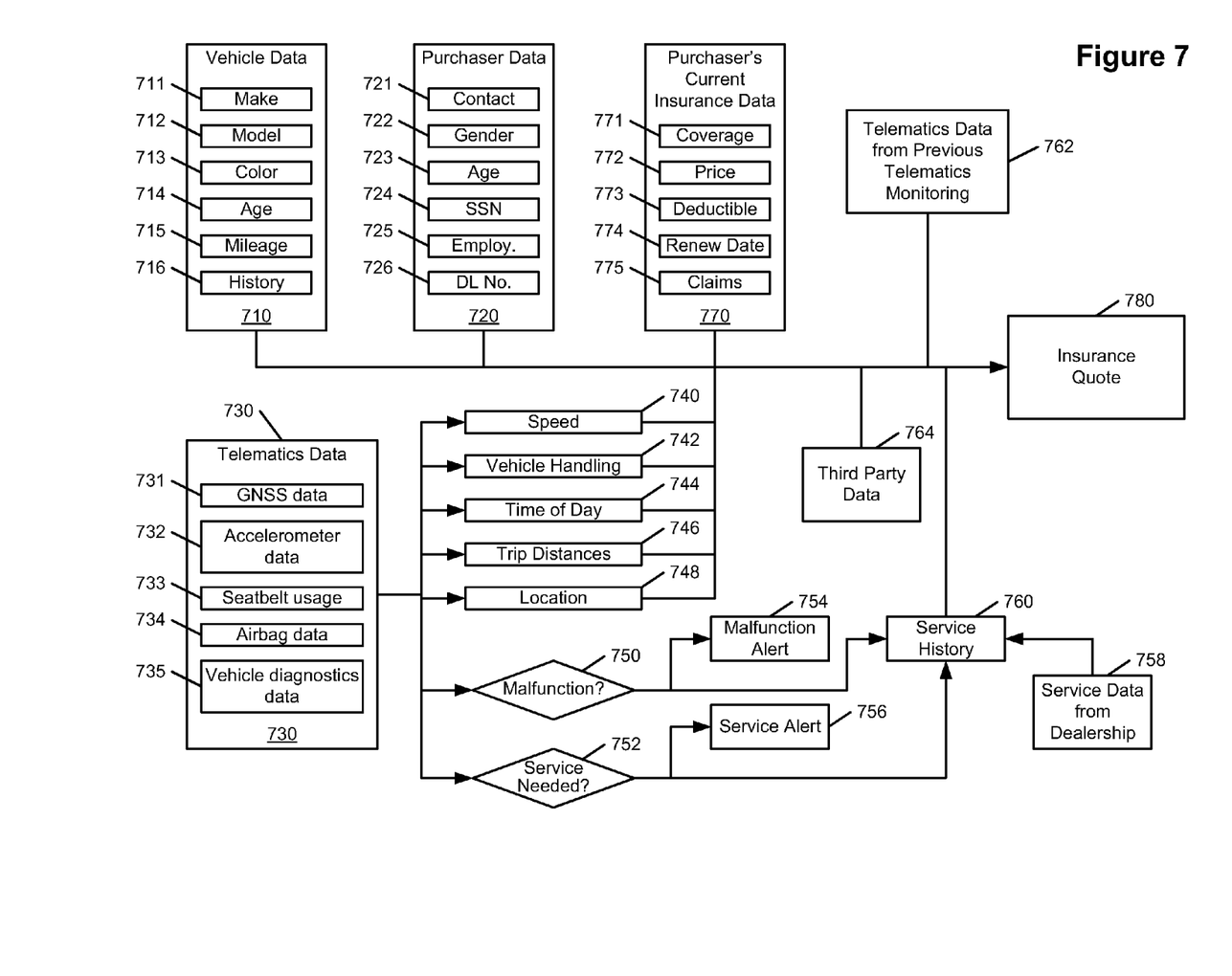
FIG. 7 is a data flow diagram illustrating a method for computing an insurance premium based on telematics data, vehicle data, purchaser data, and service data, according to an illustrative embodiment of the invention.

Suitable computer program code may be provided for analyzing driving behavior and determining an insurance premium price as described in relation to FIGS. 5 through 7. The program also may include program elements such as an operating system, a database management system and "device drivers" that allow the processor to interface with computer peripheral devices (e.g., a video display, a keyboard, a computer mouse, etc.) via the input/output controller 206.

The term "computer-readable medium" as used herein refers to any non-transitory medium that provides or participates in providing instructions to the processor of the computing device (or any other processor of a device described herein) for execution. Such a medium may take many forms, including but not limited to, non-volatile media and volatile media. Non-volatile media include, for example, optical, magnetic, or opto-magnetic disks, or integrated circuit memory, such as flash memory. Volatile media include dynamic random access memory (DRAM), which typically constitutes the main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM or EEPROM (electronically erasable programmable read-only memory), a FLASH-EEPROM, any other memory chip or cartridge, or any other non-transitory medium from which a computer can read.

Various forms of computer readable media may be involved in carrying one or more sequences of one or more instructions to the CPU 202 (or any other processor of a device described herein) for execution. For example, the instructions may initially be borne on a magnetic disk of a remote computer (not shown). The remote computer can load the instructions into its dynamic memory and send the instructions over an Ethernet connection, cable line, or even telephone line using a modem. A communications device local to a computing device (e.g., a server) can receive the data on the respective communications line and place the data on a system bus for the processor. The system bus carries the data to main memory, from which the processor retrieves and executes the instructions. The instructions received by main memory may optionally be stored in memory either before or after execution by the processor. In addition, instructions may be received via a communication port as electrical, electromagnetic or optical signals, which are exemplary forms of wireless communications or data streams that carry various types of information.

Figure 3:
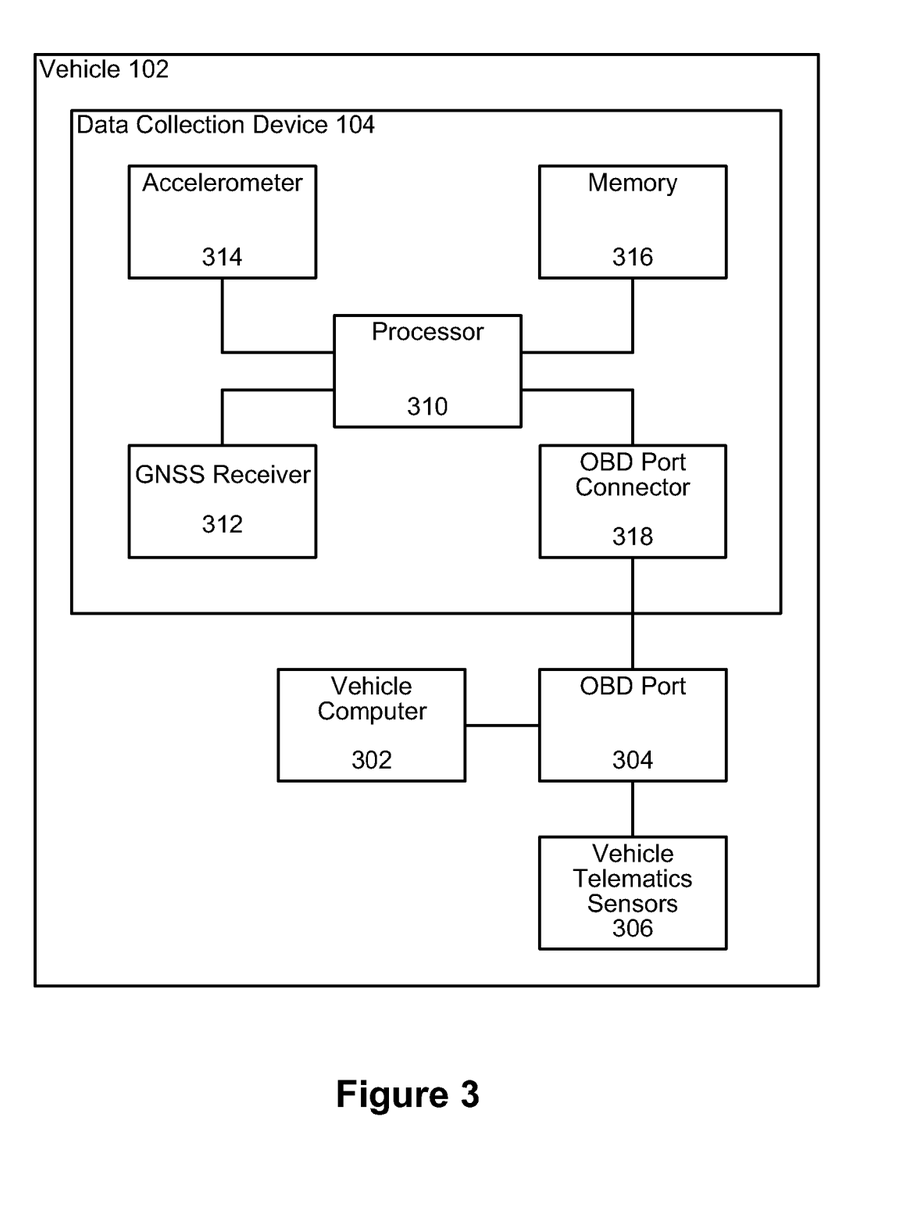
FIG. 3 is a block diagram of a vehicle and a device coupled to the vehicle for collecting data used for pricing insurance, according to an illustrative embodiment of the invention.

FIG. 3 is a block diagram of a vehicle 102 having a data collection device 104. As described in relation to FIG. 1, the vehicle 102 may be an automobile, motorcycle, truck, bus, watercraft, aircraft, or any other vehicle operated by a driver. The vehicle 102 includes a vehicle computer 302, an on-board diagnostics (OBD) port 304, and vehicle telematics sensors 306. The data collection device 104 is connected to the vehicle 102 via an OBD port connector 318 connected to the OBD port 304 to receive telematics data and other information. The data collection device 104 includes a processor 310, a GNSS receiver 312, an accelerometer 314, and memory 316. The processor 310 can be a CPU, a microprocessor, an FPGA, or any other processing unit that can be configured to execute a software or firmware program for telematics data acquisition. The processor 310 is in communication with the other elements of the data collection device 104 to facilitate the operations of the data collection device 104. The processor can also be configured to process data received from the GNSS receiver 312, the accelerometer 314, and the OBD port connector 318. Data processing may include analyzing driving behavior, determining if service is needed, determining if there is a malfunction with the vehicle, formatting data, or encrypting data.

The GNSS receiver 312 includes an antenna and associated signal processing circuitry for receiving signals from global navigation satellite system (GNSS) satellites, such as the satellites numbered 1 through n in FIG. 1, and determining its location from the signals. GNSS satellites may be, for example, GPS, GLONASS, Galileo, or Beidou satellites which send time and orbital data from which the data collection device 104 can calculate its location. In some configurations, the processor 310 calculates the location of the vehicle from data from the receiver 312. The processor 310 can pull location data from the GNSS receiver 312 at set time intervals, such as every 0.1 seconds, 0.2 seconds, 0.5 seconds, 1 second, 2 seconds, 5 seconds, or 10 seconds. The processor 310 sends the location data to the memory 316 along with a time and date stamp indicating when the vehicle was at the location. In some embodiments, the GNSS receiver 312 may be part of a separate GNSS device used by the driver for obtaining driving directions. In this case, the GNSS receiver 312 transmits data to the data collection device 104 though a wired connection or a wireless connection, e.g., BLUETOOTH or Wi-Fi.

The accelerometer 314 is a device that measures proper acceleration. Data collected from an accelerometer 314 may include or be used for obtaining the g-force, acceleration, orientation, shock, vibration, jerk, velocity, speed, and/or position of the vehicle. Some or all of these types of data are received or calculated by the processor 310. The processor 310 may collect data at intervals such as every 0.1 seconds, 0.2 seconds, 0.5 seconds, 1 second, 2 seconds, 5 seconds, or 10 seconds and store the data in the memory 316. Each data point is time and date stamped and/or location stamped. In some embodiments, the processor 310 determines intervals between data stored in the memory 316 based on trends in the data. The rate of data collection may vary based on the route being driven; for example, if a driver is travelling along a straight road at a consistent speed, the processor 310 may save data less frequently than if the driver is making frequent turns. In some embodiments, only "exception data" evident of safety events or other unusual driving behavior is stored. For example, the processor 310 may only save accelerations, decelerations, hard turns, speeds, lane change speeds, etc. with rates above a certain threshold.

The OBD port connector 318 is used to collect data from the vehicle computer 302 and/or vehicle telematics sensors 306 via OBD port 304. The OBD port 304 can have a standard interface, such as OBD-I, OBD-1.5, OBD-II, EOBD, EOBD2, JOBD, ADR 79/01, or ADR 79/02. While OBD ports are often found in automobiles, some automobiles and other classes of vehicles may use different types of diagnostic ports. In non-automobile applications, instead of an OBD port 304, any other port and corresponding connector for receiving data from a vehicle's computer can be used. The vehicle computer 302 may provide information about the vehicle's speed, the number of miles traveled, whether the vehicle is running or not, seatbelt usage, airbag deployment, and vehicle diagnostics. Vehicle diagnostics data can be used to determine the presence of any vehicle malfunctions, such as low tire pressure, low oil pressure, high engine temperature, loss of power, and stalling. With the vehicle diagnostics data, it is possible to determine whether a safety event was caused by the driver's actions or related to the malfunction, and thus not reflective of the driver's driving habits. The vehicle may contain additional telematics sensors 306 for, e.g., vehicle tracking, monitoring gasoline consumption, and vehicle safety. Data obtained by the data collection device 104 from the vehicle computer 302 and telematics sensors 306 via the OBD port 304 can supplement or be used instead of data collected by the GNSS receiver 312 and/or accelerometer 314. In some embodiments, the data collection device 104 turns on automatically when the vehicle 102 is turned on, and the vehicle 102 may power the data collection device 104. In some embodiments, the data collection device 104 is installed elsewhere in the vehicle, such as under a seat, or, if the vehicle is an automobile, under the hood, in the glove box, or in another storage area. In such embodiments, the data collection device 104 may or may not be connected to the OBD port 304. For example, the data collection device 104 can be hardwired directly to the vehicle computer 302.

In some embodiments, the data collection device 104 may also be configured to communicate with the driver or a passenger via an external user interface, such as a display screen on the dashboard of the vehicle 102. The external user interface includes output components, such as a screen or speakers, and may include input components, such as a touch screen, keyboard, or microphone. The external user interface can output driving behavior data, vehicle diagnostics data, a service alert, a malfunction alert, and any data collected from the GNSS receiver 312, accelerometer 314, and/or OBD port 304. In some embodiments, the data collection device 104 is also a navigation device that can calculate and display a route to a destination inputted by the user.

In some embodiments, rather than running the data acquisition program on a dedicated data acquisition device installed in the vehicle, the data acquisition program runs on the purchaser's mobile device, such as an IPHONE, BLACKBERRY, or any other smartphone or mobile computing device configured to collect data that can be used to analyze driving behavior. When the purchaser is purchasing the car, the dealership can install a data acquisition application or instruct the purchaser of the vehicle to install the data acquisition application on the purchaser's mobile device. The data can be collected using sensors, such as a GNSS receiver or accelerometers, in the mobile device, or the data can be transmitted from the vehicle and received by the mobile device via a wired or wireless connection.

Figure 4:
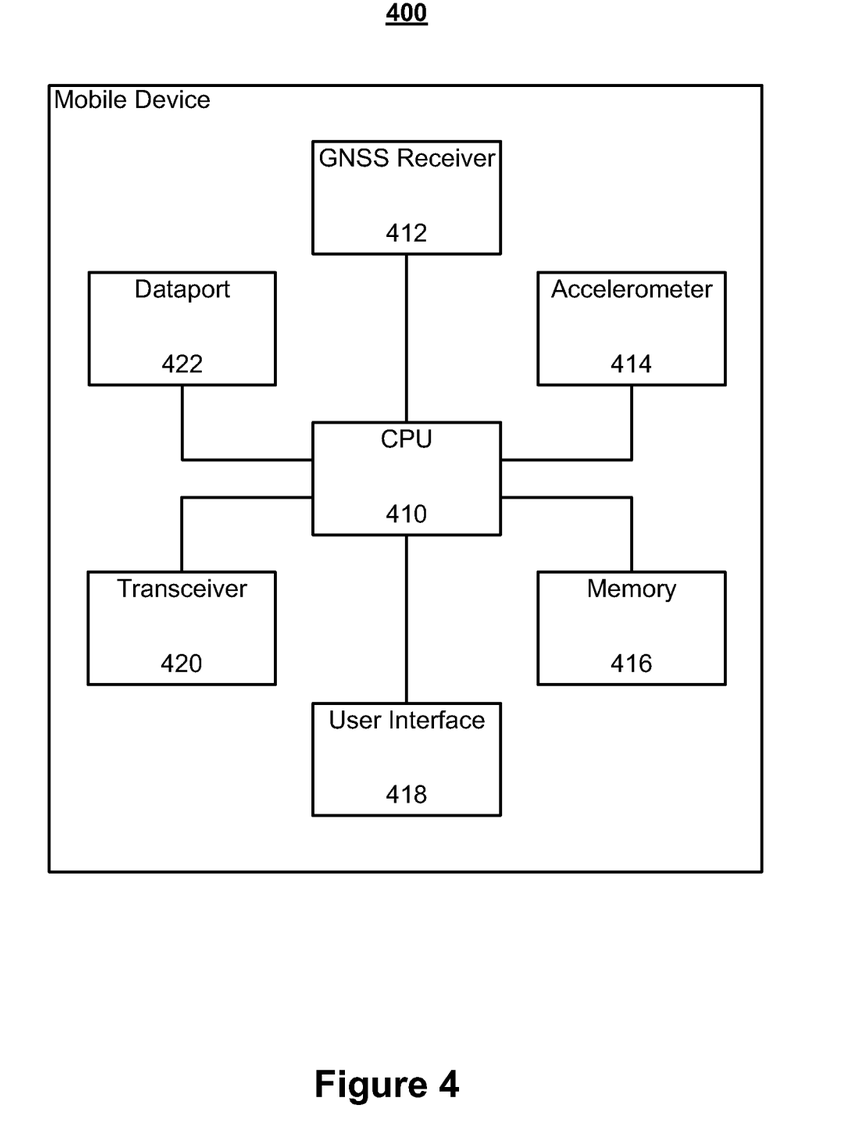
FIG. 4 is a block diagram of a mobile device used within a vehicle for collecting data used for pricing insurance, according to an illustrative embodiment of the invention.

FIG. 4 is a block diagram of an exemplary mobile device 400 that can be used instead of the data collection device 104. The mobile device 400 includes a CPU 410, a GNSS receiver 412, an accelerometer 414, and a memory 416, which are similar to the processor 310, the GNSS receiver 312, the accelerometer 314, and the memory 316, respectively, described above in relation to FIG. 3. The mobile device 400 also includes a user interface 418, a transceiver 420, and a dataport 422. The CPU 410 is configured to execute a software application for telematics data acquisition. The CPU 410 is in communication with all of the other elements of the mobile device 400 to facilitate the operation of the data collection device 400, and can perform processing similar to the processing performed by the processor 310 described above in relation to FIG. 3.

A user of the mobile device interacts with the mobile device through the user interface 418. The user interface 418 can include one or more of a screen, a touch screen, a speaker, a headphone jack, a keyboard, and a microphone. One or more transceivers 420 are used to connect to and exchange data over a cellular network, the Internet, a BLUETOOTH connection, or other wireless communications pathways. The dataport 422 is used for wired communication with the vehicle and/or the dealership system 130. The data acquisition application can be downloaded from the network or the dealership system 130 either wirelessly using the transceiver 420 or through a wired connection using the dataport 422. Once the data acquisition application has been installed, it should be executed each time the purchaser drives the vehicle. The driver can use the user interface 418 to execute the data acquisition application each time he drives the vehicle. In some embodiments, the mobile device 400 can automatically execute the data acquisition application when the mobile device 400 determines that it is in a vehicle based on the speed determined by processing the signals from the GNSS receivers 412 and/or accelerometers 414, the location based determined by processing the signals from the GNSS receivers 412, and/or other methods.

In some embodiments, the mobile device 400 is connected to the vehicle by a wireless connection (e.g., BLUETOOTH) or a wired connection using the transceiver 420 or the dataport 422, respectively. In such embodiments, the mobile device 400 can be configured to automatically execute the data acquisition application based on the presence of the vehicle connection. While the vehicle is being driven, the vehicle's computer can send telematics data to the mobile device 400. If the mobile device 400 receives data indicating a vehicle malfunction or the need for the vehicle to be serviced, the CPU 410 can create an alert or service reminder, and the alert or service reminder can be communicated to the driver via the user interface 418. Telematics data received from the vehicle and/or detected by the GNSS receivers 412 or accelerometers 414 is stored in memory 416. The telematics data can be sent to the dealership system 130, data collection device 104, and/or data processing service 106 in real time, near-real time, or after a longer period of data collection via the transceiver 420, or the data can be transmitted after a period of data collection via the dataport 422.

FIG. 5 is a flowchart of a method for selling vehicle insurance at a dealership at the time of purchase using the systems described in relation to FIGS. 1 through 4. The method involves collecting data from the purchaser (steps 502 and 504), determining the purchaser's interest in insurance (decision 506), offering temporary coverage (steps 508 through 520), and installing a telematics program to monitor driving behavior (steps 522 through 526).

When a dealer sells a vehicle to a purchaser, the dealer collects information about the purchaser, such as the purchaser's name, address, driver's license number, contact information, payment information, and current insurance information (step 502). If the purchaser needs financing, the dealer may also offer a loan to the purchaser. For the loan application, the dealer collects additional information on the purchaser, such as age, employment, and social security number (step 504). If the purchaser is interested in insurance for their vehicle (decision 506), the dealership system 130 transmits the purchaser data collected during the purchase and loan application along with information about the vehicle being purchased to the insurance system (step 508). In some embodiments, the dealer collects additional information for determining a quote for vehicle insurance, particularly if the purchaser did not apply for a loan. The types of data transmitted to the insurer for generating a premium price are discussed in greater detail in relation to FIG. 7.

During the sale transaction, the dealer determines whether the purchaser is interested in immediate insurance coverage (decision 510). The purchaser may be interested in immediate coverage if, for example, the purchaser does not currently have an insurance plan or if the purchaser is unsatisfied with his current insurance plan and would like to switch immediately. If the purchaser is interested in immediate coverage, the insurance system 108 determines an initial quote for vehicle insurance based on the purchaser information and vehicle information (step 512). In some embodiments, the insurance system 108 can set this quote to be relatively low to encourage the purchaser to buy the insurance initially. In other embodiments, the insurance system 108 can set the quote relatively high so that if the purchaser receives a long-term rate based on safe driving behavior, the purchaser is encouraged to buy the insurance since the long-term price is lower price than the price they have been paying. The insurance system 108 can use any strategy or calculation for determining the price of the initial quote.

The insurance system 108 sends this quote to the dealership system 130 (step 514), and the dealer provides the initial offer to the purchaser (step 516). The dealer receives a decision from the purchaser of whether or not he wants to purchase immediate coverage (decision 518). If the purchaser decides to purchase immediate coverage, the dealer processes the billing of the purchaser for the insurance and instructs the insurance system 108 to immediately begin coverage of the purchaser (step 520). In some embodiments, the dealership system 130 prints out a proof of insurance that the purchaser can drive away with.

Whether or not the purchaser decided to purchase immediate coverage, the dealer will determine whether the purchaser is interested in receiving a quote for insurance based on the purchaser's driving habits (decision 522). Even if the purchaser was not interested in immediate coverage (decision 510), the dealer will still determine whether the purchaser is interested in receiving a quote for insurance based on the purchaser's driving habits (decision 522). If the purchaser is interested in receiving an insurance quote based on his driving habits, the dealer configures a telematics data acquisition device, for example, by installing the data collection device 104 described in relation to FIG. 3 that executes the telematics data acquisition program, by installing the telematics data acquisition program for execution on the mobile device 400 described in relation to FIG. 4 (step 524). In other embodiments, the telematics data acquisition program is installed as a program or an add-on to a computing device already in the vehicle (e.g., an ON-STAR unit). In addition to the possibility of a low insurance rate, the dealer or insurance company can provide additional incentives to vehicle purchasers to install the telematics data acquisition program. For example, the dealership or insurance company can provide deductible insurance at little or no cost to the purchaser or provide the first service or oil change for free or at a discount, or provide an additional service, such as detailing, if the purchaser agrees to the telematics monitoring. An alternative incentive includes offering a response to a malfunction or accident detected by the telematics data acquisition program. For example, if the telematics data acquisition program indicates that the vehicle cannot be driven or is unsafe to drive, the dealership or a third party can automatically send a rental vehicle, a loaner vehicle, or a tow truck to the vehicle. The dealership, the insurance company, or a combination of the dealership and insurance company can fund such incentives. In some embodiments, these or any other incentives are provided by a third party, such as an automotive service center, a rental car company, or a towing company, that is contracted by the insurance company. Once the telematics data acquisition program is installed in the vehicle or on a device, the telematics data acquisition program monitors the driving behavior (step 526).

In some embodiments, the insurer or dealership uses the telematics data acquisition program to provide lemon insurance, an additional incentive particularly suited for accompanying the sale of a pre-owned vehicle. If the data acquisition program receives vehicle diagnostics data from the vehicle, e.g., through the OBD port, the program can determine whether the vehicle is in such poor condition that it would be considered a "lemon." In this case, the insurance company or insurer can provide a payout to the purchaser or a replacement vehicle to the purchaser. Lemon insurance is an additional incentive for allowing the dealership to install the telematics data acquisition program, and may be implemented separately from the driving behavior-based insurance pricing. In some embodiments, the dealership installs the telematics data acquisition program before selling vehicles so that the condition of the vehicles can be monitored during test drives. This can alert the dealership to any maintenance that should be completed before selling the vehicle, and the vehicle condition can be used in pricing the lemon insurance.

In some embodiments, if the purchaser has insurance and is not interested in switching his coverage immediately, the dealer can offer deductible insurance for free or for a nominal fee (e.g., in the range of $50-200) for the duration of driving behavior monitoring. The deductible insurance can be provided by the dealership or by the insurance company. With the deductible insurance, if the purchaser makes a claim on his current insurance plan during the monitoring period, the dealership or insurance company pays for all of or a portion of the purchaser's deductible. The price of the deductible insurance can vary depending on, for example, expected usage of the vehicle during the monitoring period and the purchaser's current deductible. This provides a meaningful service to the customer, but generates little risk for the insurance provider as the possible cost is known and limited.

FIG. 6 describes a method for determining an insurance rate for a driver based on telematics data once the telematics data acquisition program has been installed. The telematics data acquisition program on the data collection device 104 or mobile device 400 collects data related to the purchaser's driving behavior and the condition of the vehicle, as described in relation to FIGS. 3 and 4 (step 602), during a data acquisition period or monitoring period. The driving can be monitored for any period of time or driving distance over which a sufficient amount of data to analyze the purchaser's driving behavior can be collected, e.g., 1 month, 2 months, 3 months, or 6 months, or 500 miles, 1000 miles, 2000 miles, 3000 miles, or 5000 miles. In some embodiments, the telematics data acquisition program is used until the vehicle is returned to the dealership, e.g., for a service or oil change, at which time the device is retrieved and the data sent to the insurance system 108 or third party data processing service 106 for processing.

As the data is being collected or after the data has been collected, the data collection device 104 or mobile device 400 transmits the data to the insurance system 108 (step 604). As previously mentioned, the data may be processed by the dealership system 130 and/or a third party data processing service 106 before being sent to the insurance system 108. The insurance system 108 then determines a quote for the vehicle insurance (step 606) based on the received telematics data as well as data related to the vehicle and the purchaser that was collected by the dealer at the time of purchase. Determining the quote for vehicle insurance is described in further detail in relation to FIG. 7.

Once the quote has been determined, the insurance system 108 transmits the insurance quote to the dealership system 130 (step 608). If the data is collected and transmitted to the insurance system 108 when the vehicle is returned to the dealership for service, the insurance system 108 can preferably calculate the premium price and send the quote to the dealership system 130 while the vehicle is being serviced. Then, while the purchaser is on site at the dealership, the dealer can provide the insurance premium price, the payment schedule for insurance, the coverage offered, and additional terms to the purchaser for his consideration (step 610). The quote may include several possible types of coverage at different prices from which the purchaser can choose. If the dealer cannot provide the quote to the purchaser in person, the dealer or the insurance company can contact the purchaser and provide the quote by telephone, mail, electronic mail, or any other communications means.

The vehicle purchaser then determines whether to purchase coverage at the offered price (step 612). If the purchaser agrees to purchase insurance coverage based on the quote, the insurance company provides coverage and proof of insurance to the purchaser (step 614). In some embodiments, the dealership bills the purchaser for the insurance and receives payments from the purchaser. The dealership then transmits the received payments to the insurance company. If the purchaser has taken out an automobile loan through the dealership, insurance payments may be combined with the loan payments for the convenience of the purchaser. If the purchaser declines coverage, the insurance company and/or dealer may provide periodic reminders about the rate and any promotions available (step 616). If the purchaser declined the insurance because his driving behavior drove the price too high, the purchaser may be given the option to improve their driving behavior with continued monitoring. In this case, if the purchaser later decides to purchase insurance because their driving improved and their rate was reduced, the insurance company may request that the purchaser is continually monitored to ensure that the purchaser continues driving safely. If the purchaser declined the insurance for other reasons, he can still agree to continual monitoring in return for various incentives, including, for example, a continued agreement to pay for the purchaser's deductible if needed. The dealership and/or insurance company can continue to provide updated insurance quotes, e.g., on the receipts for services received from the dealership. This also provides additional telematics data for the insurance company to use in generating quotes for the purchaser and other prospective customers.

FIG. 7 provides greater detail into the factors involved in developing an insurance quote. The insurance quote is derived from three main classes of data: vehicle data 710, purchaser data 720, and telematics data 730. The raw telematics data 730 is processed to generate data related to driving behavior and vehicle condition. Based on the vehicle condition, a malfunction alert or service alert may be provided to the purchaser. In addition to the vehicle data 710, purchaser data 720, and telematics data 730, data from previous telematics monitoring 762 and service history data 760 can be used to determine the insurance quote 780. The processing steps for processing the data described in relation to FIG. 7 and calculating insurance rates can be performed at the insurance system 108, the third party data processing service 106, the dealership system 130, the data collection device 104 or mobile device 400, or any combination of these systems and devices.

Vehicle data 710 is comprised of data received from the dealership relating to the vehicle sold to the purchaser. For all vehicles sold, the vehicle data 710 includes the make or brand of the vehicle sold 711, the model of the vehicle sold 712, and the color of the vehicle sold 713. If the vehicle has different submodels or options available, this data is also included in the vehicle data 710. For a used vehicle, the vehicle data 710 also includes the age of the vehicle 714, the mileage of the vehicle 715, and the history of the vehicle 716. The history 716 includes information on any events such as accidents or malfunctions experienced prior to purchase. The history 716 also includes any available service records and any available information related to how and where the car was driven by its previous owner(s). The vehicle data may also include the purchase price and/or Blue Book price of the vehicle.

Purchaser data 720 is comprised of the data collected from the purchaser during the sale of the vehicle and, if applicable, collected during the loan application process. The purchaser data 720 includes basic contact information of the purchaser 721, including the purchaser's name, address, telephone number(s), fax number, email address, etc. The purchaser data 720 also includes basic demographic data, such as gender 722 and age 723. The purchaser data 720 also includes data that can be used to analyze the purchaser's finances and financial responsibility, such as social security number 724 and employment information 725. The purchaser data 720 also includes the purchaser's driver's license number 726, with which the insurance company 108 can retrieve information on the purchaser's driving history. Some of the purchaser data 720 may not be collected during a typical vehicle or vehicle loan transaction, and may be requested separately. However, because of the overlap between the types of data required for purchasing a vehicle, applying for a loan, and applying for vehicle insurance, the amount of information to be collected for the insurance application is significantly less than if the data for purchasing the vehicle and applying for the loan had not already been collected.

The telematics data 730 includes data collected by the data acquisition program. The telematics data 730 includes GNSS data 731 and accelerometer data 732 collected by the GNSS receivers 312 or 412 and accelerometers 314 or 414, respectively. The telematics data also includes data collected from the OBD port, such as seatbelt usage data 733, airbag deployment data 734, and vehicle diagnostics data 735. The telematics data 730, particularly the GNSS data 731, accelerometer data 732, and any data received from the vehicle computer relating to driving behavior (e.g., odometer data, RPM data, etc.) are processed to generate metrics indicative of driving behavior. For example, the telematics data 730 can be processed to generate a speed rating or speed summary information 740, which can include a top speed, an average speed, a rating of the speed relative to the types of roads that were driven on, and/or any other result of analyzing speeds experience by the vehicle. The telematics data 730 can be similarly processed to generate a vehicle handling rating or summary 742, which, in addition to speed, may also take acceleration and jerk into account, as well as road type and any other pertinent factors. The time of day of trips 744, distances of trips 746, and locations of trips 748 can also be analyzed for use in setting an insurance price. For example, the insurance system may determine that a driver who drives mainly at night and in rural areas receives a different rate quote than a driver who drives mainly during the daytime in urban areas.

The telematics data 730 is also analyzed to determine whether the vehicle is malfunctioning or needs service (decisions 750 and 752). The vehicle diagnostics data 735, the airbag data 734, and data indicating the distance traveled are particularly relevant for these determinations. If the vehicle is malfunctioning or should be serviced, an alert (754 or 756) is generated and communicated to the purchaser's telephone, smart phone, computer, or any other communications device, or to the vehicle 102. The alert can be in the form of a phone call, a voice mail, a text message, an email, an alert on the vehicle's dashboard, or any other type of communication. The alert can include the type of service needed or a description of the malfunction, a level of urgency of receiving the service or correcting the malfunction, and an estimated cost for receiving the service or correcting the malfunction at the dealership. The alert can include a coupon for use at the dealership and/or information about the dealership, such as a phone number to call and make an appointment or the dealership's hours. If the purchaser has purchased lemon insurance and the vehicle malfunctions, the purchaser may receive a payment or may receive the service needed to correct the malfunction for free. The need for a service or presence of a malfunction is added to a record of the vehicle's service history 760, along with data 758 from the dealership indicating what services have been received. From the service history record 760, the insurance system 108 can identify whether the purchaser is keeping his car in good condition.

In some embodiments, the purchaser may have telematics data 762 from previous telematics monitoring that was performed by the same insurance company, a different insurance company, or not associated with an insurance company. The previous telematics data 762 may be similar to the telematics data 730. If the insurance system 108 can access the previous telematics data 762, it can use this to generate an insurance quote without collecting telematics data 730. In this case, a quote can be generated as soon as the previous telematics data 762 is available to the insurance system 108. In other embodiments, telematics data 730 is still gathered, and it is supplemented by the previous telematics data 762. If the telematics data 762 was collected by a different insurance company or a different data collection device 104, the format of the data may not be in the format used by the insurance system 108 for calculating an insurance premium. In this case, the insurance system 108 can convert the data format into the data format output by the insurance company's data acquisition program.

In some embodiments, data from a third party data provider 764 is also accessed for generating the insurance quote. For example, data from a third party data provider 132 may provide additional information related to the purchaser, such as the purchaser's driving record or credit history. Other third party data, such as traffic and weather data, is processed in conjunction with the received telematics data to evaluate driving patterns in view of the road conditions, and may be used when evaluating the purchaser's driving speed and vehicle handling.

If the purchaser already has an insurance plan, the purchaser may provide current insurance data 770 related to his current insurance plan. The purchaser can provide a summary of coverages provided 771, the premium price of the plan 772, and the deductible price of the plan 773, which the insurance company can use to determine a competitive quote. The purchaser can also provide the renewal date 774. Before the renewal date 774, the insurance company and/or dealer can provide reminders or advertisements the purchaser to remind him of their rate and promotions. The current insurance data 770 also can include information on any claims filed on the insurance plan 775, which can be used to supplement the purchaser's driving record and to evaluate the insurance risk of the purchaser. Since the purchaser may not have all of the data on his current insurance plan, in some embodiments, the purchaser can allow the dealership 130 to access data related to his current insurance plan from his current insurer, e.g., through a secure web interface or by contacting the current insurer directly. Alternatively, the dealer can add some or all of the current insurance data 770 at a later time after the purchaser has been able to gather the current insurance data.

Based on some or all of the vehicle data 710, purchaser data 720, telematics data 730, processed driving behavior characteristics 740-748, service history 760, previous telematics data 762, third party data 764, and current insurance data 770, the insurance system 108 or an underwriter determines a premium price or set of premium prices based on coverage for the driver. Safe driving behaviors, low mileage, seatbelt usage, good vehicle conditions, good attention to service needs, and good financial history may be associated with lower insurance premiums. The various factors may be rated separately, e.g., an overall safety rating can be calculated, or a driving behavior rating can be calculated. The factors can be weighted and the premium price based on the various rating factors and their relative weights. In some embodiments, the insurance system 108 or an underwriter uses the telematics data 730 in an algorithm for generating an insurance quote. In other embodiments, the insurance system 108 or an underwriter uses the telematics data 730 to calculate a discount to apply to an insurance quote that is determined by the insurance system 108 or an underwriter without the telematics data 130. In some embodiments, some of the data, particularly the telematics data, is used to determine whether an eligibility requirement is satisfied. For example, if the telematics data shows that the purchaser's driving behaviors are too unsafe, the insurance company may decide not to offer insurance to the purchaser. If the telematics data meets the eligibility requirement, the telematics data may or may not be used further in calculating the insurance quote 780.

In some embodiments, the insurance quote 780 is not based on the telematics data but merely the fact that telematics data is being collected. For example, the insurance company can give the purchaser a discount on an insurance premium if the insurance company knows that telematics data is being collected, but the insurance company may not use the telematics data itself for pricing the insurance plan. The providing of an incentive can be similarly based on whether or not telematics data is being collected. In some embodiments, the insurance quote 780 and/or the incentive is based on the frequency or duration of the telematics data collection. For example, if the purchaser has the telematics data acquisition program installed on a mobile device 400, but does not run the program frequently enough or for a long enough period of time, the purchaser may be ineligible for the incentive or for an insurance discount. Alternatively, the incentive or discount can be based on the frequency or duration with which the purchaser runs the telematics data acquisition program.

While preferable embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system comprising:
   a telematics data acquisition device, comprising a processor, a GNSS receiver, an accelerometer and an OBD port interface, configured at a dealership to collect telematics data of a vehicle sold by the dealership while the vehicle is in operation, the processor configured to collect telematics data from the accelerometer at intervals, time and location stamp the collected telematics data, and encrypt the collected telematics data;

a communications interface configured to:
receive encrypted telematics data collected and encrypted by the telematics data acquisition device, the telematics data including vehicle diagnostics data collected from the OBD port interface and data collected by the GNSS receiver and the accelerometer and indicative of operation of the vehicle for a monitoring period subsequent to and commencing substantially upon purchase of the vehicle and continuing until completion of one of a period of time or driving of the vehicle a distance;
receive vehicle data indicating at least a make and a model of the vehicle sold by the dealership;
receive vehicle owner data related to a purchaser of the vehicle and collected at the dealership;
receive data indicative of an automobile insurance policy issued by a second insurer to the vehicle owner and covering the vehicle, the data including a deductible amount under the policy;
provide the telematics data upon completion of the monitoring period, the telematics data indicative of operation of the vehicle for the monitoring period, the vehicle data and the vehicle owner data to a computer processor of a computing device of a first insurer;
receive, after completion of the monitoring period, an insurance quote from the computer processor of the computing device of the first insurer, the insurance quote being for the purchaser and for coverage of the vehicle; and
transmit the insurance quote for the purchaser of the vehicle; and a computing device of the first insurer in communication with the communications interface, the computing device comprising a computer processor configured to:
receive the telematics data, the vehicle data and the vehicle owner data from the communications interface;
determine, upon completion of the monitoring period, the insurance quote for the purchaser for the coverage of the vehicle based on at least the received telematics data, the received vehicle data, and the received vehicle owner data;
access data indicative of one or more conditions associated with a predetermined incentive provided to the purchaser in return for allowing the telematics data acquisition device to collect the telematics data, the predetermined incentive being an offer to pay at least a portion of the deductible amount for a claim filed with the second insurer under the insurance policy issued by the second insurer, during the monitoring period, and determine, based on the received telematics data, whether the one or more conditions have been met;
responsive to determining that the one or more conditions have been met, provide output data indicative that the at least a portion of the deductible amount will be covered by the first insurer; and
analyze the received vehicle diagnostics data and data indicative of distance traveled to determine at least one of: the vehicle is malfunctioning; and the vehicle needs service, and responsive to determining at least one of the vehicle is malfunctioning and the vehicle needs service, generate an alert and communicate the alert to a communications device of the vehicle owner;

wherein configuring the telematics data acquisition device comprises installing a telematics data acquisition application on a smartphone owned by the purchaser, the telematics data acquisition application configuring the smartphone to acquire the telematics data and transmit the telematics data via a wireless communications pathway.

2. The system of claim 1, wherein:
the communications interface is further configured to receive data related to the vehicle purchaser from an application for a loan to fund the purchase of the vehicle; and
the computer processor of the computing device of the first insurer is further configured to determine the insurance quote based on the data collected by the data from the loan application.

3. The system of claim 1, wherein transmitting the insurance quote comprises transmitting an insurance premium price and an insurance premium payment schedule to the dealership.

4. The system of claim 1, wherein the communications interface is configured to receive a payment for insurance transmitted by the dealership.

5. The system of claim 1, wherein the computer processor of the computing device of the first insurer is further configured to determine the insurance quote after receiving a predetermined amount of telematics data.

6. The system of claim 1, wherein the telematics data acquisition device is a first telematics data acquisition device, and:
the communications interface is configured to receive telematics data collected by a second telematics data acquisition device; and
the computer processor of the computing device of the first insurer is further configured to determine the insurance quote based on the telematics data collected by the second telematics data acquisition device.

7. The system of claim 6, wherein the telematics data collected by the second telematics data acquisition device is collected during a period of time before data is collected by the first telematics data acquisition device.

8. The system of claim 1, wherein configuring the telematics data acquisition device comprises installing in the vehicle a telematics data acquisition device configured for running a telematics data acquisition program.

9. A method comprising:
collecting, by a telematics data acquisition device, comprising a processor, a GNSS receiver, an accelerometer and an OBD port interface, configured at a dealership to collect telematics data of a vehicle sold by the dealership while the vehicle is in operation, telematics data of the vehicle, the collecting including collecting, by the processor, telematics data from the accelerometer at intervals, and time and location stamping, by the processor, the collected telematics data;
encrypting, by the processor of the telematics data acquisition device, the collected telematics data;
receiving, by a communications interface, encrypted telematics data collected by the telematics data acquisition device, comprising a GNSS receiver and an accelerometer, the received telematics data including data collected by the GNSS receiver and the accelerometer indicative of operation of the vehicle subsequent to purchase of the vehicle and for a monitoring period commencing substantially upon vehicle purchase and continuing for one of a period of time or a driving distance, and vehicle diagnostics data collected via the OBD port interface;

receiving, by the communications interface, vehicle data indicating at least a make and a model of the vehicle sold by the dealership;

receiving, by the communications interface, vehicle owner data related to a purchaser of the vehicle and collected at the dealership;

receiving, by the communications interface, data indicative of an automobile insurance policy issued by a second insurer to the vehicle owner and covering the vehicle, the data including a deductible amount under the policy;

transmitting, upon completion of the monitoring period, by the communications interface, the telematics data indicative of operation of the vehicle for the monitoring period, the vehicle data and the vehicle owner data, to a computer processor of a computing device of a first insurer;

determining, after completion of the monitoring period, by the computer processor of the computing device of the first insurer, an insurance quote for the purchaser based on the received telematics data, the received vehicle data, and the received vehicle owner data;

providing by the computer processor of the computing device of the first insurer the insurance quote to the communications interface;

transmitting, by the communications interface, the insurance quote for the purchaser of the vehicle;

accessing, by the computer processor of the computing device of the first insurer, data indicative of one or more conditions associated with a predetermined incentive provided to the purchaser in return for allowing the telematics data acquisition device to collect telematics data, the predetermined incentive being an offer to pay at least a portion of the deductible amount for a claim filed with the second insurer under the insurance policy issued by the second insurer, during the monitoring period, and determining, based on the received telematics data, whether the one or more conditions have been met;

responsive to determining that the one or more conditions have been met, providing by the computer processor of the computing device of the first insurer output data indicative that the at least a portion of the deductible amount will be covered by the first insurer; and analyzing the received vehicle diagnostics data and data indicative of distance traveled to determine at least one of: the vehicle is malfunctioning and the vehicle needs service, and responsive to determining at least one of the vehicle is malfunctioning and the vehicle needs service, generating an alert and communicating the alert to a communications device of the vehicle owner;

wherein configuring the telematics data acquisition device comprises installing a telematics data acquisition application on a smartphone owned by the purchaser, the telematics data acquisition application configuring the smartphone to acquire the telematics data and transmit the telematics data via a wireless communications pathway.

10. The method of claim 9, further comprising:

receiving, by the communications interface, data related to the vehicle purchaser from an application for a loan to fund the purchase of the vehicle; and determining, by the computer processor of the computing device of the first insurer, the insurance quote based on the data collected by the data from the loan application.

11. The method of claim 9, wherein transmitting the insurance quote comprises transmitting an insurance premium price and an insurance premium payment schedule to the dealership.

12. The method of claim 9, further comprising receiving, by the communications interface, a payment for insurance transmitted by the dealership.

13. The method of claim 9, further comprising determining, by the computer processor of the computing device of the first insurer, the insurance quote after receiving a predetermined amount of telematics data.

14. The method of claim 9, wherein the telematics data acquisition device is a first telematics data acquisition device, the method further comprising:

receiving, by the communications interface, telematics data collected by a second telematics data acquisition device; and determining, by the computer processor of the computing device of the first insurer, the insurance quote based on the telematics data collected by the second telematics data acquisition device.

15. The method of claim 14, wherein the telematics data collected by the second telematics data acquisition device is collected during a period of time before data is collected by the first telematics data acquisition device.

16. The method of claim 9, wherein configuring the telematics data acquisition device comprises installing in the vehicle a telematics data acquisition device configured for running a telematics data acquisition program.

\* \* \* \* \*